128,365

UNITED STATES PATENT OFFICE.

ANDREW J. CRAWFORD, OF BROOKLYN, NEW YORK, ASSIGNOR TO HIMSELF, WILLIAM H. STONE, OF ST. LOUIS, MISSOURI, JOSEPH H. LIVINGSTON AND JAMES D. WELCH, OF PHILADELPHIA, PENNSYLVANIA, AND HENRY S. HAWKS AND ROBERT A. FISHER, OF NEW YORK CITY.

IMPROVEMENT IN THE MANUFACTURE OF ARTIFICIAL STONE.

Specification forming part of Letters Patent No. 128,365, dated June 25, 1872.

*To all whom it may concern:*

Be it known that I, ANDREW J. CRAWFORD, of Brooklyn, in the county of Kings and State of New York, have invented a new and useful Improvement in the Manufacture of Artificial Stone, to be known as "Crawford's Excelsior Artificial Stone," of which the following is a specification:

This invention has for its object the production of a composition of matter which, after having "set" or become indurated, will partake in its nature of the natural-stone formations—that is to say, it will have a hard surface, not easily abraded, and not affected by atmospheric influences, and the mass will be capable of resisting in an eminent degree either a crushing or tensile force. This composition, while plastic, can be molded into any shape desired, for building-blocks, ornamental designs, &c., and by varying the proportions as hereinafter specified can be employed for the formation of tiles or the laying of pavements in sections or continuous lengths. It consists in a due and proper admixture of any of the hydraulic cements, under which head are enumerated Puzzolana, Portland, Roman, Louisville, Rosendale, and other well-known cements, the solidification of which depends upon the combination of lime with silica and alumina, forming first a hydrate and finally a silicate, together with sand, gravel, or broken stone, pulverized limestone, oxide of iron, and silicate of soda or potassa, in proportions about as hereinafter enumerated for the formation of the plastic mass; and, further, in the finishing treatment, by the use of a wash or coating formed by dissolving alum in water and steeping calcined gypsum therein, drying the mass and subjecting it to heat, and finally forming a paste therefrom to be applied to such articles as are molded from the plastic mass and require a polished surface.

It is here stated that wherever, in the following list of ingredients, the word cement is used one of the before-mentioned cements is intended, always giving the preference to Portland cement, the weight of which shall average one hundred and twenty pounds to the bushel; and wherever other cements are used the relative proportions of the ingredients should be modified to allow for the inferiority of the cement.

For moldings, stucco, &c., upon which little or no weight rests, take, by measure—

| | |
|---|---|
| Portland cement | 15 parts. |
| Sand | 80 " |
| Pulverized limestone | 80 " |
| Oxide of iron | 20 " |
| Alkaline silicate | 5 " |
| Total | 200 " |

For blocks used in buildings, and which are subject to weight, take, by measure—

| | |
|---|---|
| Cement | 15 parts. |
| Sand | 40 " |
| Gravel, broken stone, pebbles, or similar material | 90 " |
| Pulverized limestone | 35 " |
| Oxide of iron | 15 " |
| Alkaline silicate | 5 " |
| Total | 200 " |

For sidewalks, paving, &c., a necessary quality of which is that its surface shall not abrade or wear off easily, take, by measure—

| | |
|---|---|
| Cement | 8 parts. |
| Sand | 32 " |
| Gravel, broken stones, or similar material | 128 " |
| Pulverized limestone | 24 " |
| Oxide of iron | 7 " |
| Alkaline silicate | 1 " |
| Total | 200 " |

To form the plastic mass the several ingredients, excepting the cement and alkaline silicate, are intimately mixed and commingled by any suitable means. The cement is then added, and a second intermixing takes place, after which the alkaline silicate is introduced, together with the smallest amount of water which will bring the materials to a plastic condition. The mass is then thoroughly worked until it exhibits a homogenous condition, when it is ready to be molded into the form desired or used in the laying of walks, &c.

Where a building-block is the purpose intended, or the molded articles require a smooth polished surface, it is obtained in the following manner: Mix seventy-five or eighty pounds of calcined gypsum with two gallons of water in which a pound of sulphate of iron or other metallic sulphate and one and a half pound of alum have been previously dissolved, dry the mass by exposure to the air for one day, and calcine at a dull red heat or by exposure to the open air. The powder, thus prepared, is formed into a thick paste with water and the surface of the article brushed or coated therewith, and finally finish by polishing with emery, pumice-stone, or in any of the well-known ways.

Having thus described my invention, what I claim, and desire to secure by Letters Patent, is—

The artificial stone herein described, called Crawford's Excelsior Artificial Stone, and composed of a hydraulic cement, together with sand, gravel, or broken stone, pulverized limestone, oxide of iron, and an alkaline silicate, about in the proportions specified, to be used for pavements, sidewalks, building-blocks, &c.

In testimony that I claim the foregoing I have hereunto signed my name this 6th day of June, 1872.

A. J. CRAWFORD.

Witnesses:
  H. S. DAVIS,
  J. H. JOHNSTON.